D. S. Miller.
Churn Dasher.
No. 79,491.  Patented Jan. 30, 1868.
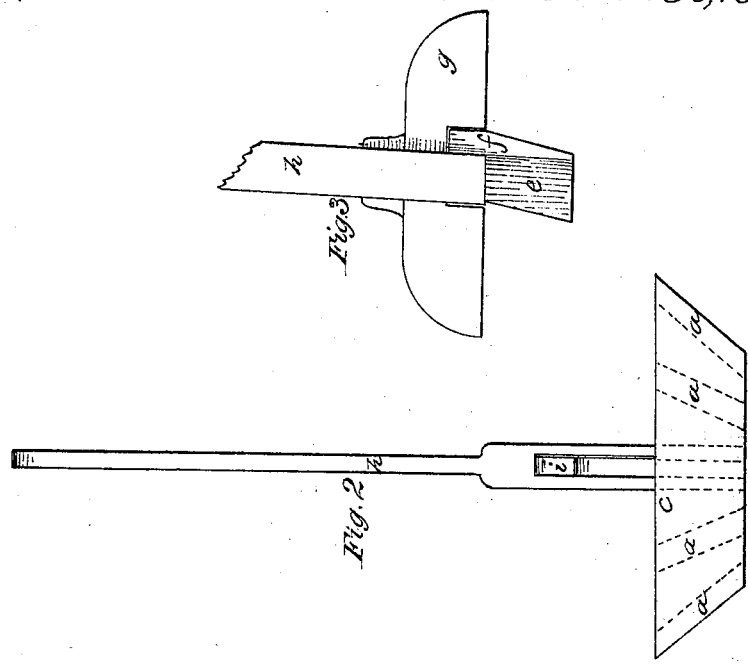
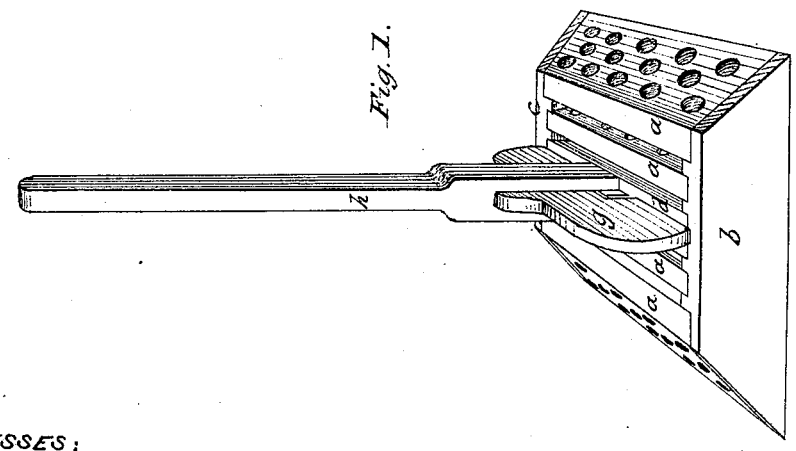
WITNESSES:
H. P. K. Peck
S. B. Peck
INVENTOR:
David S. Miller
by
his atty H. P. K. Peck.

United States Patent Office.

DAVID S. MILLER, OF WEST ALEXANDRIA, OHIO.

Letters Patent No. 79,491, dated June 30, 1868.

IMPROVEMENT IN CHURN-DASHER.

*The Schedule referred to in these Letters Patent and making part of the same.*

TO ALL WHOM IT MAY CONCERN:

Be it known that I, DAVID S. MILLER, of West Alexandria, in Preble county, in the State of Ohio, have invented certain new and useful Improvements in Churn-Dashers; and I do hereby declare that the following is a full and exact description thereof, reference being had to the accompanying drawings, and to the letters of reference marked thereon.

Figure 1 is a perspective view of my invention.

Figure 2 represents a side view of the dasher and handle, the former being reversed.

Figure 3 represents the handle and deflector-board, with the devicess for fastening the handle to the other parts.

I construct my dasher by fastening the four perforated wings $a$ (which stand at an angle of about forty-five degrees to a horizontal line) to the main frame, which consists of the two pieces, $b$ $c$, connected at the centre by the frame-piece $d$. The central piece $d$ is provided with a mortise, in which the angular tenon $e$ may be inserted and secured by the wedge $f$. The mortise into which the handle is inserted passes obliquely through piece $d$, and the tenon $e$ is formed with its lower end broader than it is made at the shoulder, so that the wedge $f$ and tenon $e$ fill the mortise, and retain the parts securely together.

The deflector-board $g$ is of the width of the mortise in the handle $h$, and has a square recess formed in one edge, as represented in the drawings. The key $i$ is inserted in the mortise in the handle, to retain the deflector in place.

From the foregoing description it will be seen that the dasher is reversible upon its handle.

To connect the parts, the handle $h$ will be properly inserted in the mortise in frame-piece $d$ of the dasher, and the wedge $f$ will be also inserted; then the deflector-board $g$ will be placed in the mortise in the handle $h$, and thrust down upon the piece $d$, with its recess astride the wedge $f$, as seen in figs. 1 and 3; and finally, the key $i$ is forced into the mortise in handle $h$, above deflector-board $g$, by which means the structure is retained in place, ready for use.

When the dasher is used as arranged or adjusted in fig. 1, the churning is produced by the downward stroke with much less power, and the butter will be readily gathered against the deflecting-board $g$; but when the dasher is reversed, as shown in fig. 2, a less period of time is required to churn the butter, as the work is performed by both the upward and downward stroke of the dasher. The action of the dasher upon the cream, when adjusted as represented in fig. 1, will be to force the currents through the spaces between the wings $a$, (which converge towards the deflector,) and as the currents of cream strike the deflector they are broken, and thrown outwardly towards the sides of the churn, and thus the work is quickly accomplished in a perfect manner.

Having fully described my invention, what I claim, and desire to secure by Letters Patent, is—

The reversible dasher, $a$ $b$ $c$ $d$, in combination with the deflector-board $g$, when the parts are constructed, arranged, and operate in the manner and for the purpose described.

In testimony whereof, I have hereunto set my hand, this 10th day of March, A. D. 1868.

DAVID S. MILLER.

Witnesses:
H. P. K. PECK,
S. E. PECK.